H. BERGH.
INSTRUMENT FOR SLAUGHTERING ANIMALS.
APPLICATION FILED JUNE 4, 1908.
910,775.
Patented Jan. 26, 1909.
2 SHEETS—SHEET 1.
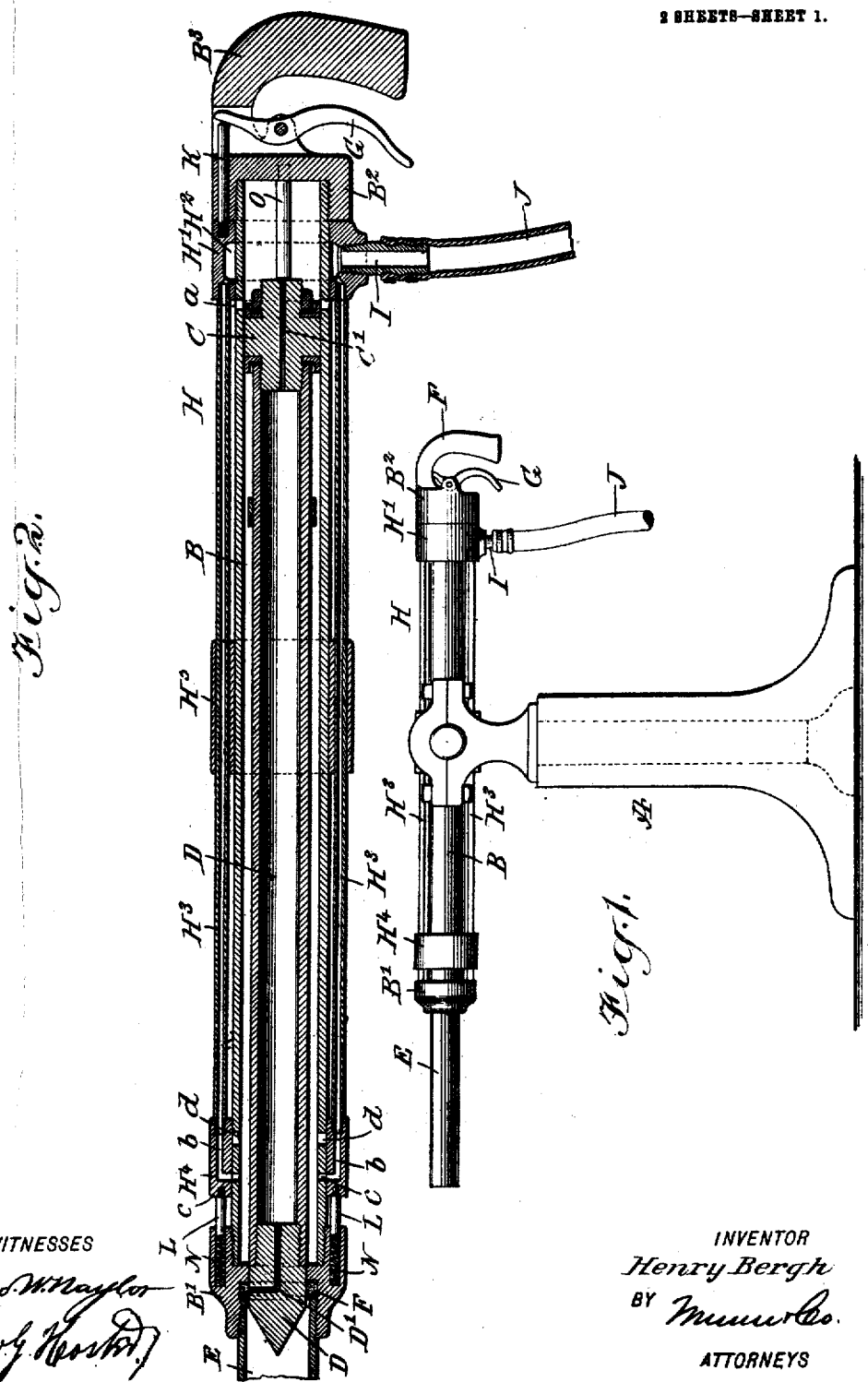
WITNESSES
INVENTOR
Henry Bergh
BY
ATTORNEYS

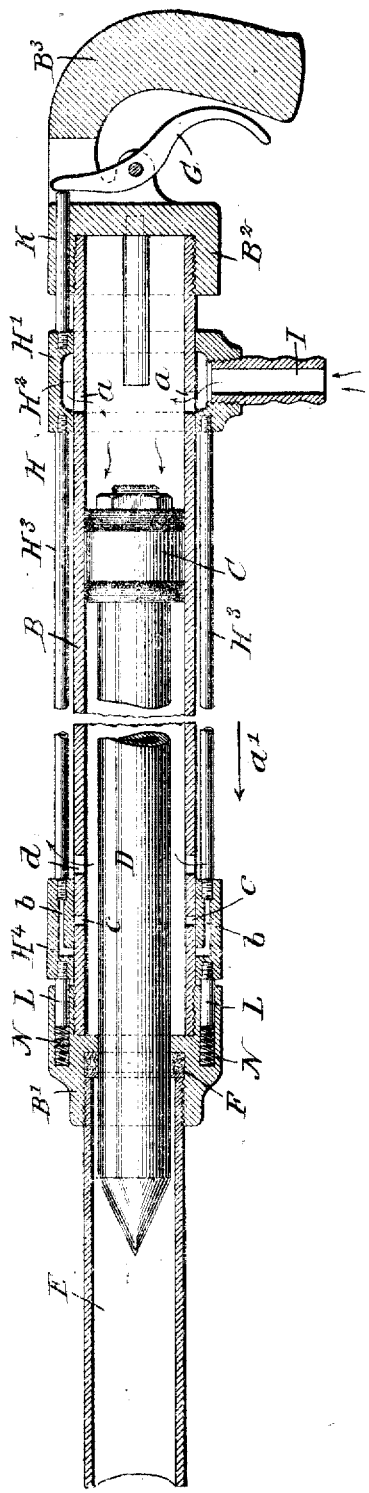

UNITED STATES PATENT OFFICE.

HENRY BERGH, OF NEW YORK, N. Y.

INSTRUMENT FOR SLAUGHTERING ANIMALS.

No. 910,775.    Specification of Letters Patent.    Patented Jan. 26, 1909.

Application filed June 4, 1908. Serial No. 436,588.

*To all whom it may concern:*

Be it known that I, HENRY BERGH, a citizen of the United States, and a resident of the city of New York, borough of Manhattan, in the county and State of New York, have invented a new and Improved Instrument for Slaughtering Animals, of which the following is a full, clear, and exact description.

The invention relates to butchering and its object is to provide a new and improved instrument for slaughtering animals, notably cattle, and arranged to permit of forcibly projecting a javelin into the brain of the animal with a view to produce almost instant and painless death, thus rendering the slaughtering of the animal humane, and obviating any misdirected or abortive blows against the head of the animal.

The invention consists of novel features and parts and combinations of the same which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement mounted on a stand; Fig. 2 is an enlarged longitudinal central section of the improvement, arranged for hand use and showing the parts in position ready for projecting the javelin; and Fig. 3 is a similar view of the same and showing the parts in released position and the javelin on its outward stroke.

The instrument may be arranged for hand use or mounted on a stand A in the fashion of a swivel gun, as shown in Fig. 1. In either case the instrument has a barrel B in which reciprocates a plunger C, to the forward end of which is secured the shank of a javelin D, mounted to slide in a bearing formed in the forward head B' of the barrel B. The head or point of the javelin D is normally contained within a tubular extension E attached to the head B', and of such a length that when the javelin D is at the end of its outward stroke then the head or point projects beyond the tubular extension E, thus allowing of placing the end of the tubular extension E on the head of the animal to be slaughtered, previous to projecting the javelin D forward for the head or point of the javelin D to enter the animal's head at the point engaged by the end of the extension E. A packing F is arranged in the head B' around the javelin D, to prevent the leakage of compressed air or other fluid under pressure, used for moving the plunger C forward and backward in the barrel B, as hereinafter more fully explained.

The rear head B² of the barrel B is provided with a handle B³ adapted to be taken hold of by the operator for conveniently manipulating the instrument, and between the handle B³ and the head B² is arranged a trigger G for manipulating a slide valve H controlling the admission and exhaust of a fluid pressure, such as compressed air, to and from the end of the barrel B. The slide valve H is provided with a head H' surrounding the rear end of the barrel B and having an annular recess or cavity H² into which leads a nipple I connected by a hose J with a fluid pressure supply such as a reservoir filled with compressed air or the like. From the head H' extends rearwardly a pin K mounted to slide in the head B² and engaged by the trigger G, so that when the operator presses the trigger G the pin K and with it the valve H is moved forward into the position shown in Fig. 3. The head H' of the slide valve H controls ports *a* normally open to the atmosphere, as shown in Fig. 2, but when the trigger G is pressed and the valve H is pushed forward then the cavity H² moves in register with the ports *a*, so that the fluid pressure can pass from the cavity H² by way of the ports *a* into the rear end of the barrel B, to act on the plunger C therein with a view to force the plunger C forward and with it the javelin D. The head H' of the valve H is connected by pipes H³ with the forward head H⁴, likewise mounted to slide on the barrel B, and having channels *b* leading from the forward ends of the pipes H³ and adapted to connect with ports *c* formed in the forward end of the barrel B. The rear ends of the pipes H³ open into the cavity H² so that fluid pressure can pass from the cavity H² by way of the pipes H³ to the channels *b* and by way of the ports *c* into the forward end of the barrel B. Adjacent to the ports *c* and somewhat in the rear thereof are arranged exhaust ports *d* adapted to connect the forward end of the barrel B with the atmosphere at the time the trigger G is pressed and the slide valve H is pushed into a forward position, as shown in Fig. 3. When the slide valve H is in the rear position, as shown in Fig. 2, then the channels b register with the ports c, to allow compressed air to pass from the cavity H² by way of the pipes H³, channels b and ports c into the forward end of the barrel B, to return the plunger C and to hold the latter in its rearmost position, as shown in Fig. 2. The forward head H⁴ of the slide valve H is provided with forwardly-extending pins L extending into recesses in the forward barrel head B', and in the said recesses are held springs N pressing the pins L, to return the slide valve H to a normal rearmost position on the operator releasing the trigger G. In the head B² of the barrel B is secured a stop O projecting forwardly in the barrel B, to limit the rearward or return sliding motion of the plunger C and the javelin D.

The operation is as follows: When the several parts are in the position shown in Figs. 1 and 2, then the plunger C is in a rearmost position to hold the javelin D retracted, and when it is desired to slaughter an animal, it is only necessary for the operator to place the terminal of the tubular extension E against the head of the animal at the desired spot, and then press the trigger G, so that the slide valve H is moved forward into the position shown in Fig. 3, whereby fluid pressure passes into the rear end of the barrel B, to project the plunger C and the javelin D in a forward direction. The javelin D passes with its head or point out of the terminal of the tubular extension E, to enter the animal's head, thus killing the same. When the valve H is moved forward the head H⁴ thereof uncovers the ports d, to allow the air in front of the plunger C to escape to the atmosphere at the same time the channels b are cut off from the ports c, thus stopping the supply of compressed air to the front end of the valve. As soon as the operator releases the trigger G, the springs N pressing against the pins L return the slide valve H to its normal rearmost position, as shown in Fig. 2, whereby the head H' is cut off from the ports a and the latter open to the atmosphere, and at the same time the exhaust ports d are closed by the head H⁴ and the ports c are connected with the channels b for the fluid pressure to pass into the forward end of the barrel B with a view to push the plunger C back into its rearmost position, thus retracting the javelin D.

In order to give the desired rigidity to the valve H, the latter is provided with a sleeve H⁵ mounted to slide on the barrel B, and in which the middle portions of the pipes H³ are secured.

From the foregoing, it will be seen that normally the plunger C and the javelin D are in a rearmost or retracted position, and when the trigger G is pressed, the plunger and the javelin are forcibly projected forward, to cause the point or head of the javelin to enter the animal's head, as above described, and as soon as the operator releases the trigger G the plunger C and the javelin D return to normal or retracted position.

In order to aid the javelin in killing the animal, use is made of a small amount of air under pressure passing through the piston C, and the hollow stem of the javelin D into the point or head thereof, from whence it can escape into the brain of the animal, thus producing a further disruptive effect on the brain and a consequent more instantaneous insensibility. The openings C' and D' in the piston C and the point or head of the javelin D are arcuate, to avoid undue loss of air pressure.

It is understood that when using highly compressed air, the javelin is projected with such force that quick and humane execution of the animal is the result.

Having thus described my invention, I claim as new and desire to secure by Letters Patent:

1. An instrument for slaughtering animals comprising a javelin, a piston in connection with the javelin, a barrel in which the piston moves, means for admitting fluid pressure behind the piston whereby to project the javelin, means in connection with the piston and the barrel for admitting the pressure in front of the piston when the javelin is at the end of its stroke, and means in connection with the javelin, for permitting the escape of a portion of the fluid pressure from the end thereof, whereby to pass said pressure into the brain of the animal.

2. An instrument for slaughtering animals comprising a javelin, a piston in connection therewith, a barrel in which the piston moves, means for admitting fluid pressure behind the piston, whereby to project the javelin, and means in connection with the javelin for admitting a portion of such pressure into the brain of the animal.

3. An instrument for slaughtering animals comprising a barrel, a piston therein, a javelin having a hollow stem secured to the said piston, means for admitting compressed air into the barrel to propel the piston and the javelin forward, the said piston and the javelin head having minute openings opening into the hollow stem, whereby to permit some of the compressed air to pass through the said openings and the hollow stem for the purpose set forth.

4. An instrument for slaughtering animals, comprising a barrel, a plunger mounted to reciprocate in the said barrel, a javelin having its shank attached to the said plunger and projecting beyond the forward end of the barrel, a slide valve on the said barrel connected with a fluid pressure supply, and controlling admission and exhaust ports at the ends of the said barrel, a trigger for pushing the said slide valve forwardly, and springs for returning the slide valve on releasing the trigger.

5. An instrument for slaughtering animals, comprising a barrel, a plunger mounted to reciprocate in the said barrel, a javelin having its shank attached to the said plunger and projecting beyond the forward end of the barrel, a slide valve on the said barrel connected with a fluid pressure supply, and controlling admission and exhaust ports at the ends of the said barrel, a trigger for pushing the said slide valve forwardly, springs for returning the slide valve on releasing the trigger, and a handle on the rear head of the said barrel and between which and the said rear head extends the said trigger.

6. An instrument for slaughtering animals comprising a barrel, a javelin mounted for reciprocation in the barrel, and projecting beyond the forward end thereof; a slide valve on the barrel connected with the fluid pressure supply and controlling admission and exhaust ports at the end of the said barrel, a trigger for pushing the said valve forwardly, and springs for returning the slide valve on releasing the trigger.

In testimony whereof I have signed my name to this specification in the presence of two subscribing witnesses.

HENRY BERGH.

Witnesses:
 THEO. G. HOSTER,
 JOHN P. DAVIS.